(12) United States Patent
Ge et al.

(10) Patent No.: US 9,958,061 B2
(45) Date of Patent: May 1, 2018

(54) METHOD FOR CONTROLLING VARIATOR OF TRANSMISSION SYSTEM

(71) Applicant: Caterpillar Inc., Peoria, IL (US)

(72) Inventors: Xinyu Ge, Peoria, IL (US); Hua Gu, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 200 days.

(21) Appl. No.: 15/137,141

(22) Filed: Apr. 25, 2016

(65) Prior Publication Data

US 2016/0238130 A1 Aug. 18, 2016

(51) Int. Cl.
*F16H 61/47* (2010.01)
*F16H 61/42* (2010.01)

(52) U.S. Cl.
CPC ............ *F16H 61/47* (2013.01); *F16H 61/42* (2013.01)

(58) Field of Classification Search
CPC ................. F16H 61/42; F16H 61/47
See application file for complete search history.

(56) References Cited

U.S. PATENT DOCUMENTS

| | | | |
|---|---|---|---|
| 5,355,772 A * | 10/1994 | Shimada | F16H 61/42 91/417 R |
| 8,095,280 B2 | 1/2012 | Price | |
| 8,500,587 B2 | 8/2013 | Du et al. | |
| 8,522,822 B2 | 9/2013 | Johnson | |
| 8,725,366 B2 | 5/2014 | Hubbard et al. | |
| 8,758,181 B2 | 6/2014 | Calvert | |
| 8,762,014 B2 | 6/2014 | Lister et al. | |
| 8,795,133 B2 | 8/2014 | Nackers et al. | |
| 9,169,926 B2 | 10/2015 | Nackers et al. | |
| 2011/0048829 A1 * | 3/2011 | Matsumoto | F16H 61/435 180/197 |
| 2011/0178684 A1 * | 7/2011 | Umemoto | F16H 61/421 701/51 |
| 2014/0364268 A1 | 12/2014 | Akerblom et al. | |

* cited by examiner

*Primary Examiner* — Edwin A Young

(57) ABSTRACT

A method for controlling a variator system of a machine is disclosed. The method includes storing a plurality of work cycle patterns associated with an operation of the machine in a memory module of a control system, and determining operating parameters of the machine based on inputs from a plurality of machine sensors. The method further includes classifying the current work segment as one of the plurality of predetermined work segments and determining an error value based on an actual output speed and a desired output speed of the variator. The method further includes determining a closed-loop gain value corresponding to the current work segment and the error value. The method further includes implementing the determined closed-loop gain and the determined current range to the actuator to adjust position of a swash plate of the variator, to control an output speed of the variator.

1 Claim, 5 Drawing Sheets

| ERROR VALUE | | DEFAULT | DIG SEGMENT | REVERSE LIFT SEGMENT | FORWARD LIFT SEGMENT | DUMP SEGMENT | REVERSE LOWER SEGMENT | FORWARD LOWER SEGMENT |
|---|---|---|---|---|---|---|---|---|
| | SPEED ERROR 1 | | | | | | | |
| | SPEED ERROR 2 | | | | | | | |
| | SPEED ERROR 3 | | | | | | | |
| | SPEED ERROR 4 | | | | | | | |
| | SPEED ERROR 5 | GAIN VALUE 1 | GAIN VALUE 2 | GAIN VALUE 3 | GAIN VALUE 4 | GAIN VALUE 5 | GAIN VALUE 6 | GAIN VALUE 7 |
| | SPEED ERROR 6 | | | | | | | |
| | SPEED ERROR 7 | | | | | | | |
| | SPEED ERROR 8 | | | | | | | |
| | SPEED ERROR 9 | | | | | | | |

FIG. 4

METHOD FOR CONTROLLING VARIATOR OF TRANSMISSION SYSTEM

TECHNICAL FIELD

The present disclosure relates to a variator system and more particularly to a method for controlling the variator system used in a transmission system of a machine.

BACKGROUND

Earth moving machines, such as wheel loaders and excavators, are designed to perform different operations, such as, but not limited to, digging, dumping, and carrying material from one place to another. A power source, such as an internal combustion engine, provides power to ground engaging members of the machine. The power source also provides power to hydraulic elements of the machine. Generally, a continuously variable transmission is employed in the machine to transmit the power from the power source to the ground engaging members. The transmission of power through the continuously variable transmission is controlled by a control unit.

While performing different operations, the machine may require varying amount of power to operate machine elements, such as hydraulic elements and ground engaging members. Since different operations of the machine may be carried out in different segments of a work cycle, varied amount of power may be required by the hydraulic elements and the ground engaging members in each segment of the work cycle. Such requirement of varied amount of power reduces responsiveness of the machine. Further, when the hydraulic elements require a higher amount of power from the power source during operation, stalling of the power source may occur. As such, operation of the machine may get affected.

U.S. Pat. No. 8,762,014, hereinafter referred as the '014 patent, describes a torque control operation for a transmission. The transmission includes a variable displacement variator with a hydraulic actuator. The transmission is engaged in a neutral state such that the variator output experiences substantially zero torque. A first hydraulic pressure sweep to the hydraulic actuator is commanded while a corresponding sweep of motor speed ratio of the variator is recorded. The transmission is engaged into a locked mode to provide a fixed output speed and a second hydraulic pressure sweep to the hydraulic actuator is commanded, and a corresponding sweep of variator output torque is recorded during this sweep. A torque/pressure map is then constructed relating motor torque, motor speed ratio, and actuator pressure by scaling the sweep of motor speed ratios and the sweep of variator output torque. The resultant map is usable to provide teed forward torque control of the trans mission.

Although the resultant control maps of the '014 patent may improve transmission performance, the variator system may still be less than optimal. In particular, the variator system may not consider all factors affecting transmission performance or be able to adapt to changing performance over a life of the machine.

SUMMARY OF THE DISCLOSURE

In one aspect of the present disclosure, a method for controlling a variator of a transmission system of a machine is provided. The method includes storing a plurality of work cycle patterns associated with an operation of the machine in a memory module of a control system Each of the plurality of work cycle patterns includes a plurality of predetermined work segments. Further, each of the plurality of predetermined work segments is associated with a closed-loop gain. The method further includes determining, by the control system, operating parameters of the machine based on inputs from a plurality of machine sensors. The method further includes detecting a current work segment of the machine based on the determined operating parameters of the machine. The method further includes classifying the detected current work segment of the machine as one of the plurality of predetermined work segments based on the plurality of work cycle patterns and the current work segment. The method further includes determining an error value based on an actual output speed of the variator and a desired output speed of the variator. The method further includes determining a closed-loop gain value corresponding to the current work segment and the error value. The method further includes determining a current range for actuating an actuator of the variator based on the current work segment. The method further includes implementing the determined closed-loop gain and the determined current range to the actuator to adjust position of a swash plate of the variator, to control an output speed of the variator.

Other features and aspects of this disclosure will be apparent from the following description and the accompanying drawings.

BRIEF DESCRIPTION OF THE DRAWINGS:

FIG. 4 is schematic representation of a map for a closed-loop gain designed for controlling the output speed of the variator system.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature.

Figure 1:
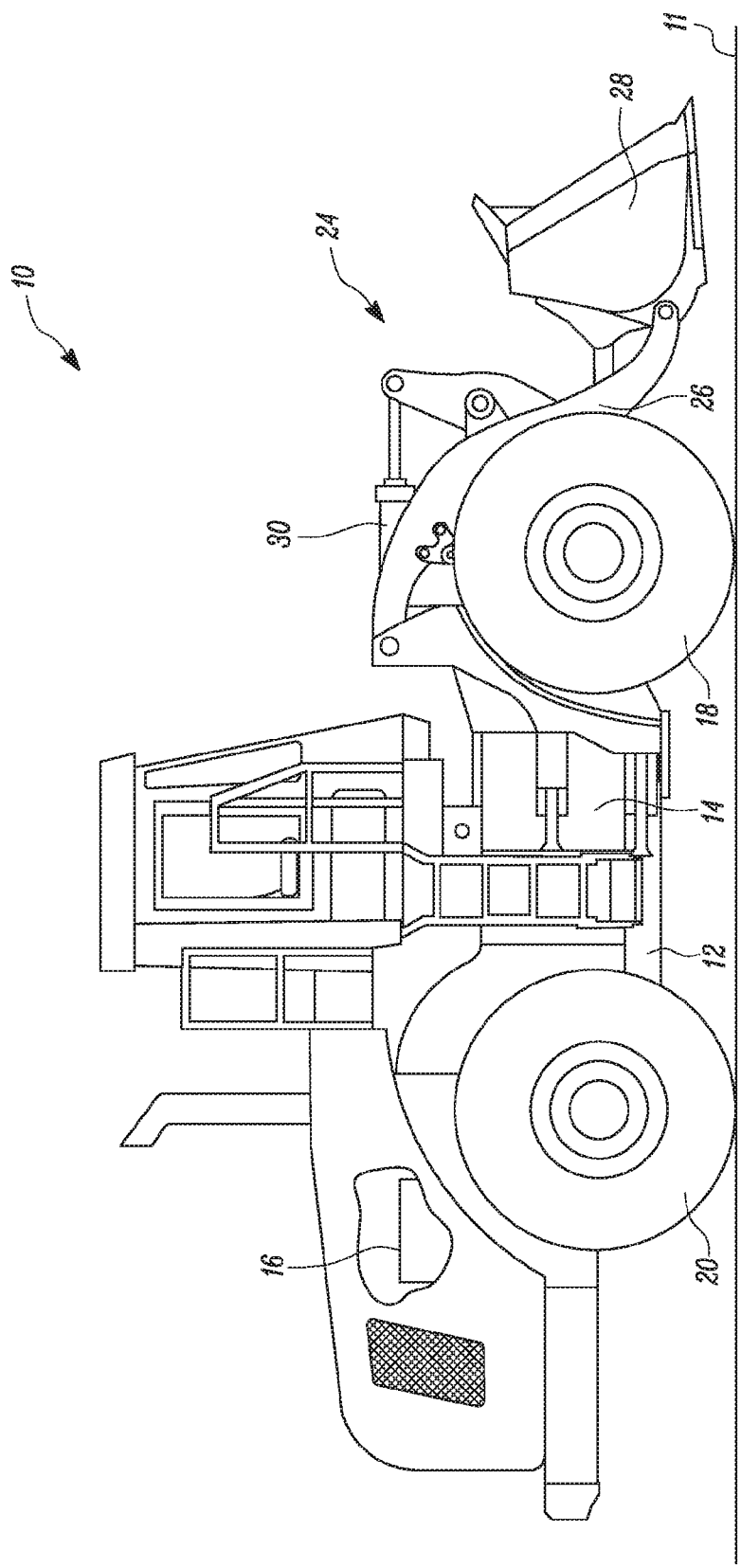
FIG. 1 is a side view of a machine having a transmission system, according to an embodiment of the present disclosure.

FIG. 1 illustrates a side view of a machine 10. Although the illustrated embodiment of the machine 10 is a wheel loader, the machine 10 may be any other on-highway or off-highway vehicle. The machine 10 is designed to perform different operations on a work surface 11. The operations performed by the machine 10 may include, but not limited to, excavation, compacting, and crushing of earthen material. The operations are performed in a predefined cyclic manner. The cycle of operation is alternatively referred to as "the work cycle". The work cycle is further associated with multiple work segments in a predefined order. In the illustrated embodiment, the work cycle includes a dig segment, a reverse lift segment, a forward lift segment, a dump segment, a reverse lower segment, and a forward lower segment. However, in various embodiments, the work cycle may include any number work segments.

For example, in order to perform excavation operation, the work cycle associated with the excavation operation may include a dig segment that may be followed by a lilt segment. The lift segment may be followed by a swing segment Which may in turn be followed by a dump segment. It may be noted that different work cycles may have similar or different work segments that are carried out in different order.

The machine 10 includes a machine body 12 having a transmission system 14. The transmission system 14 is supported on the machine body 12. The transmission system 14, also known as drivetrain, receives power from an engine 16. Further, the transmission system 14 transmits the power to one or more ground engaging elements, such as front wheels 18 or rear wheels 20.

The machine 10 also includes an implement system 24 attached to a front end of the machine body 12. The engine 16 may also provide power to the implement system 24. The implement system 24 includes a pair of arms 26 movably attached to the front end of the machine body 12. The pair of arms 26 may be moved upward and downward in order to lift and lower a bucket 28. The bucket 28, capable of holding material, is movably coupled to the pair of arms 26, and adapted to engage with the work surface 11.

The implement system 24 further includes one or more hydraulic cylinders 30 to control movement of the pair of arms 26. The one or more hydraulic cylinders 30 may also control movement of the bucket 28. As such, the engine 16 may also provide power to a hydraulic system (not shown) that supplies hydraulic power to the one or more hydraulic cylinders 30.

Figure 2:
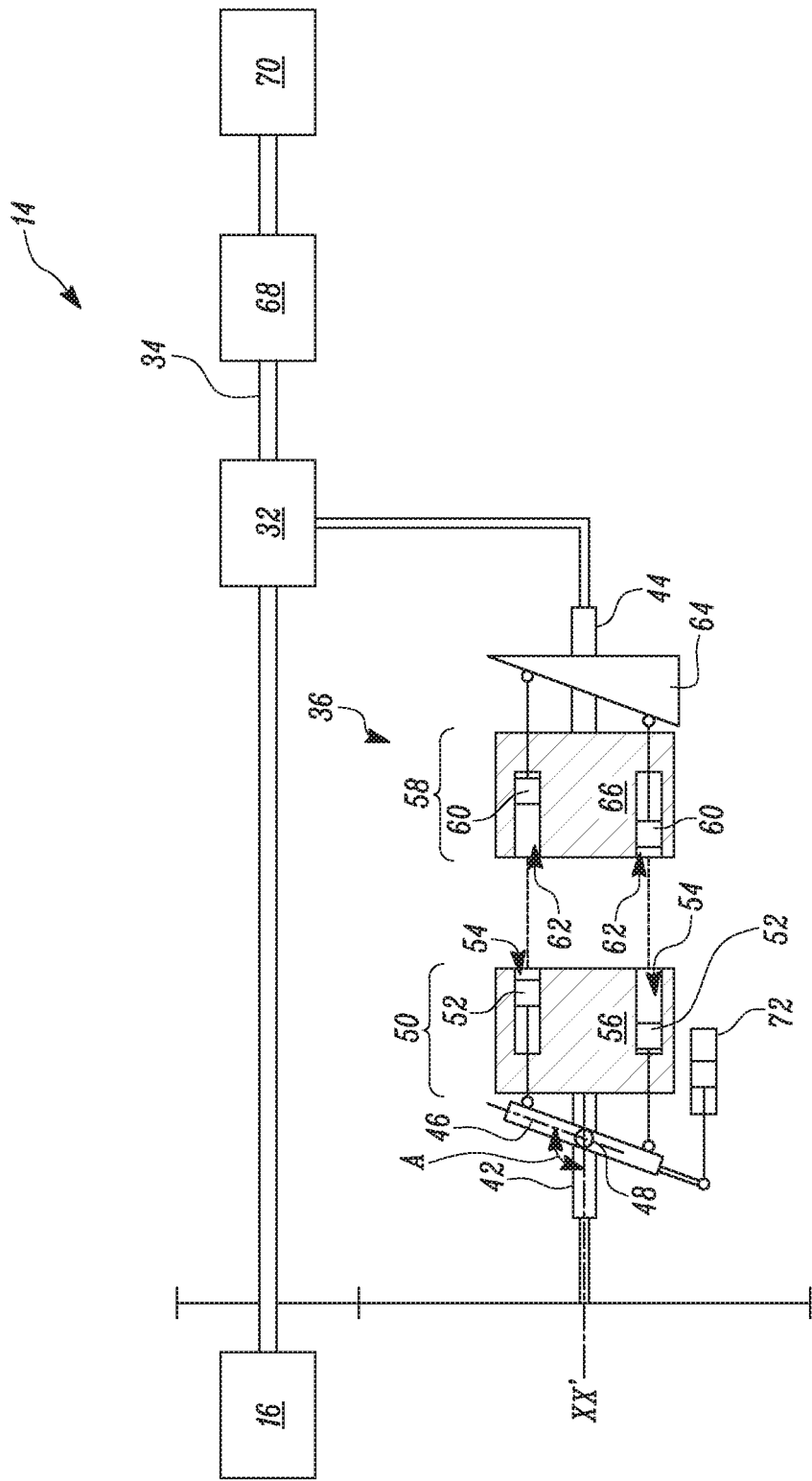
FIG. 2 is a schematic diagram of the transmission system of the machine of FIG. 1.

Referring to FIG. 2, a schematic diagram of the transmission system 14 of the machine 10 is depicted. In the present embodiment, the transmission system 14 is a Continuously Variable Transmission (CVT). In the present embodiment, the CVT is embodied as a Parallel Path Variator Transmission (PPVT) or a hydrostatic parallel path transmission as shown in FIG. 2. It should be understood, however, that a variety of transmission systems, other than Parallel Path Variator Transmission or a hydrostatic parallel path transmission may be employed for propelling the machine 10.

The transmission system 14 includes a gear system 32, and a variator 36. The variator 36 is powered by the engine 16. The variator 36 includes an input shaft 42 adapted to receive the power from the engine 16 and an output shaft 44 adapted to transmit power to the gear system 32. The gear system 32 may be a planetary gear drive adapted to receive an input power from the variator 36 and the power from the engine 16.

An output shaft 34 of the gear system 32 is connected to a final drive 68. The final drive 68 receives power from the engine 16 and the variator 36 through the gear system 32. The final drive 68 drives a load 70, such as a gross weight of the machine 10 carried by the front and rear wheels 18, 20 when the machine 10 is at rest, and a weight of aggregate carried by the bucket 28 and the pair of arms 26, or any machine component that may require power during the operation of the machine 10.

The variator 36 includes a pump 50 coupled with the input shaft 42. The pump 50 is further associated with a swash plate 46 and a number of pistons 52. Specifically, the swash plate 46 may be at the input end 38. The variable angle swash plate 46 is pivotally coupled to the input shaft 42, such that the swash plate 46 may be positioned at an angle of inclination "A" with respect to a longitudinal axis XX'. The angle of inclination "A" of the swash plate 46 may be changed about a pivot 48, such as a pin or a hook. Each of the number of pistons 52 is slidably disposed in a chamber 54 defined within a pump carrier 56. Further, the pistons 52 ride on the swash plate 46, such that a range of movement of the pistons 52 is set by the angle of inclination "A" of the swash plate 46.

The variator 36 further includes a motor 58 coupled with the output shaft 44. The motor 58 has a similar arrangement of the pump 50 that includes a number of pistons 60 in respective number of chambers 62. The chambers 62 are formed in a motor carrier 66 that rotates the output shaft 44. The number of pistons 60 of the motor 58 is slidably engaged upon a fixed swash plate 64. The number of chambers 54 of the pump 50 is in fluid communication with the number of chambers 62 of the motor 58 via hydraulic fluid that fills the number of chanters 62 and intervening conduits (not shown).

When the engine 16 is rotating at a constant speed, an input torque is transmitted to the input shaft 42 of the pump 50. Further, the pistons 52 slide within the chambers 54 push the hydraulic fluid to flow from the chambers 54 of the pump 50 to the chambers 62 of the motor 58. The flow of the hydraulic fluid into the chambers 62 of the motor 58 causes the motor 58 to rotate thereby transferring torque from the pump 50 to the motor 58. The rate of flow of the hydraulic fluid can be varied by changing the angle of inclination "A" of the swash plate 46, thereby controlling an output torque of the variator 36 at the output shaft 44. Therefore, change of the angle of inclination "A" of the swash plate 46 changes the output torque at the output shaft 44, thereby changing an output speed and an output torque of the gear system 32. Thus, in other words, an output speed of the variator 36 can be varied to continuously vary the output speed and the output torque of the gear system 32, at any given speed of the engine 16. The output torque from the gear system 32 is supplied to the final drive 68 that drives the load 70.

The variation in the angle of inclination "A" of the swash plate 46 is controlled by an actuator 72. The actuator 72 is an electro-hydraulic valve that operates based on electric power to control the angle of inclination "A" of the swash plate 46 about the input shaft 42. More specifically, the actuator 72 may be connected to the swash plate 46 to change the angle of inclination "A" of the swash plate 46 upon actuation of the actuator 72.

Figure 3:
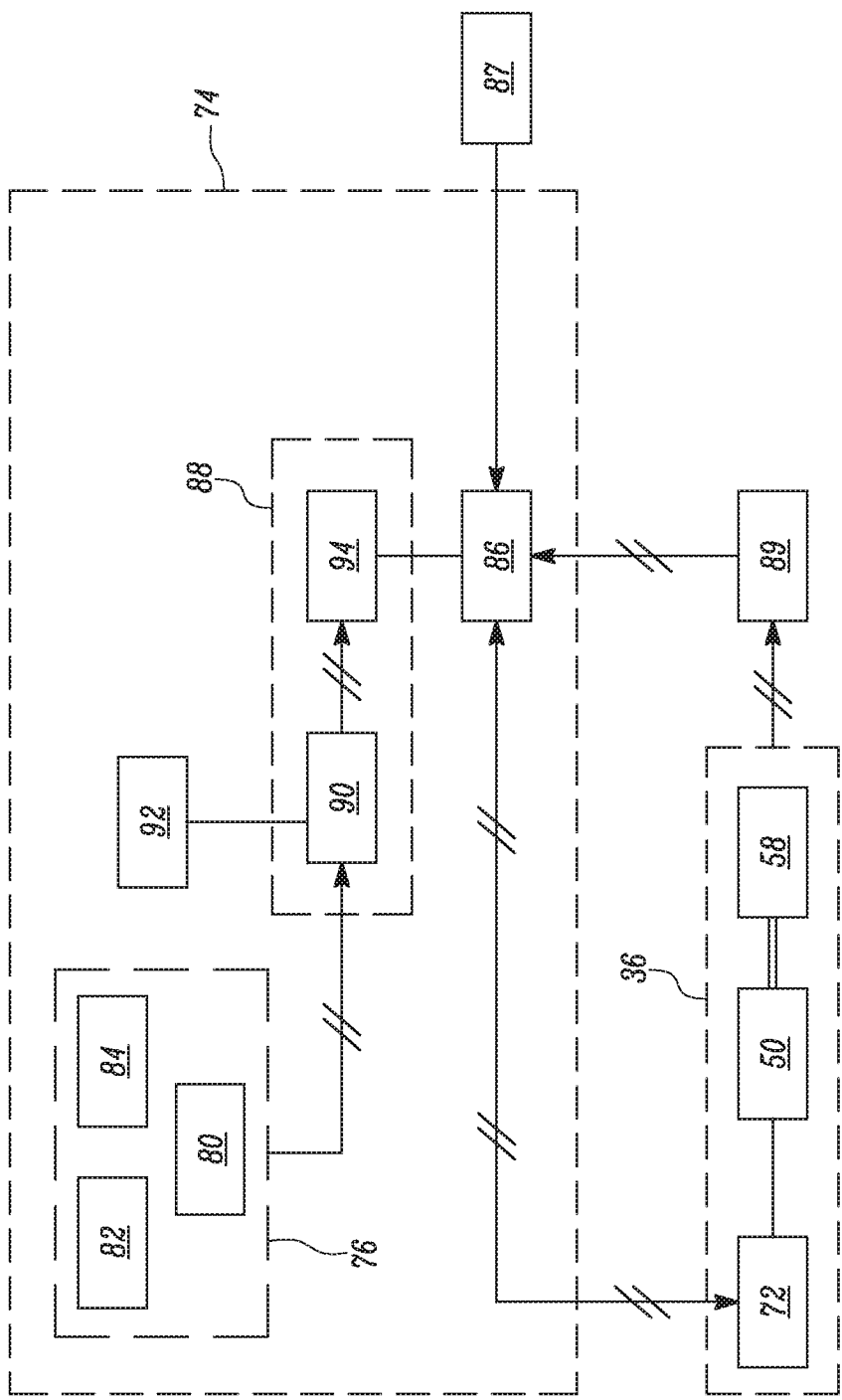
FIG. 3 is a block diagram of a control system for controlling an output speed of a variator of the transmission system of FIG. 2.
Figure 5:
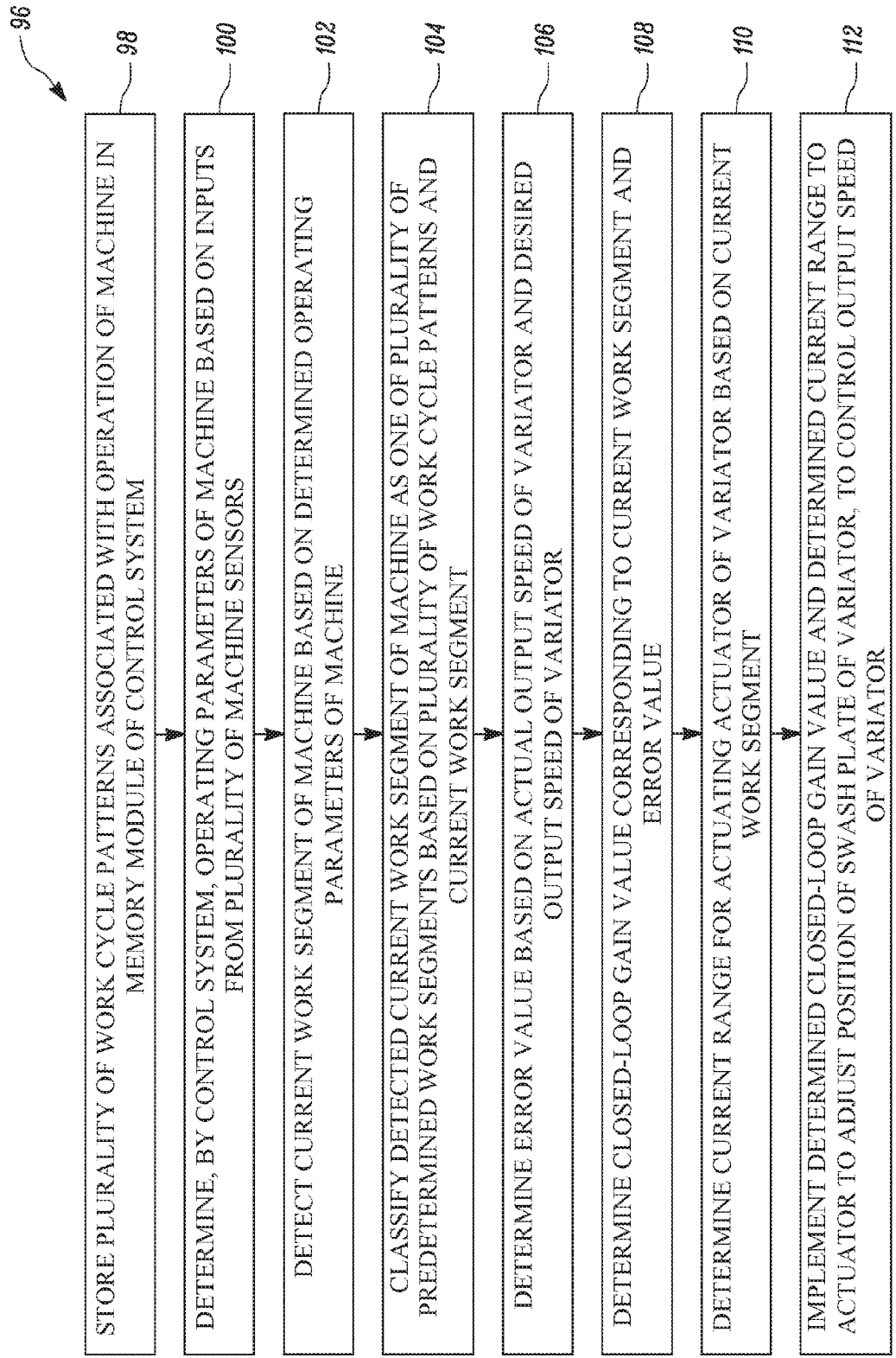
FIG. 5 is a flow chart of a method for controlling the output speed of the variator of the transmission system.

As illustrated in FIG. 3, the machine 10 includes a control system 74 to actuate the actuator 72 and thereby to vary the angle of inclination "A" of the swash plate 46. The control system 74 may be further configured to monitor, classify, and control operations of the machine 10 and the implement system 24. In particular, the control system 74 includes a plurality of machine sensors 76, such as a load sensor 80, a front grade sensor 82, a rear grade sensor 84, an engine speed sensor (not shown), and a transmission sensor (not shown).

The load sensor 80 may be configured to generate a signal indicative of a load carried by, moved by, or otherwise lifted by the machine 10, In one example, the load sensor 80 may generate a signal indicative of the load carried by the bucket 28 and the pair of arms 26 during the operation of the machine 10. In another example, the load sensor 80 may be a pressure sensor associated with the pair of hydraulic cylinders 30 to determine a load acting on the hydraulic cylinders 30 that may be related to the load carried by the bucket 28. In yet another example, the load sensor 80 may be a load cell placed between mating mechanical components, such as linkage members and support structure of the implement system 24 of the machine 10. In such case, signals received from the load sensor 80 may be related to strain of the mechanical components and used to determine the load on the bucket 28. The signals from the load sensor 80 may be communicated to the control system 74 for further processing.

The front and the rear grade sensors 82, 84 may together be configured to determine a grade of the work surface 11 under the machine 10, The front and the rear gale sensors 82, 84 may be a light or sound detection technique that may sense a terrain of the work surface 11. Further, each of the front and the rear grade sensors 82, 84 may be configured to generate a signal indicative of a position and/or an orientation of the machine 10 with respect to the work surface 11. For example, the front and rear grade sensors 82, 84 may be position sensors that may sense a relative position of the bucket 28 with respect to the pair of arms 26 and a relative position of the pair of arms 26 with respect to the machine body 12. The two positions may be used to calculate an overall pitch, for example lateral tilt, of the machine 10 in a travel direction, and a grade of the work surface 11. In an example, the front and the rear grade sensors 82, 84 may be an Inertial Measurement Unit (IMU) having one or more accelerometers and/or gyroscopes that generate signals indicative of change in orientation of the machine 10 relative to force of gravity.

The machine 10 may include the engine speed sensors that may be associated with a rotating component of the engine 16. The engine speed sensors may be configured to generate a signal indicative of an output speed of the engine 16. It may be contemplated that any other sensors may alternatively be used to determine the grade of the work surface 11.

Referring to FIG. 3, the control system 74 includes a controller 86 and an adaptive adjustment module 88. The adaptive adjustment module 88 is configured to communicate with the controller 86 to control the output speed of the variator 36 based on actuation of the actuator 72. The adaptive adjustment module 88 includes a pattern recognition module 90 configured to communicate with the machine sensors 76 to receive signals indicative of multiple operating parameters of the machine 10, Specifically, the pattern recognition module 90 is configured to communicate with the load sensor 80, the front grade sensor 82, and the rear grade sensor 84.

The pattern recognition module 90 receives the signals generated by the front grade sensor 82, the rear grade sensor 84, and the load sensor 80 to determine the load carried by the machine 10. In an example, various parameters including, but not limited to, moving direction in steep grade of the work surface 11 and gross weight of the machine 10, the load acting on the machine 10 may be determined based on the signals from the machine sensors 76.

The pattern recognition module 90 may be further configured to communicate with the transmission sensor. The transmission sensor is configured to generate signals indicative of various operating parameters including, but not limited to, displacement of the pump 50, position of the swish plate 46, speed of the pump 50, pressure of the hydraulic fluid flow, and displacement of the motor 58 of the variator 36. The pattern recognition module 90 may be further configured to communicate with the engine speed sensor that may be associated with a rotating component of the engine 16. The engine speed sensors may be configured to generate a signal indicative of an output speed of the engine 16. Thus, the pattern recognition module 90 is configured to determine the load acting on the machine 10 and a current machine operating condition, otherwise referred to as the current work segment (i.e., at time $T_O$) based on the signals received from the front grade sensor 82, the rear grade sensor 84, and the load sensor 80. Further, the control system 74 includes a memory module 92 configured to communicate with the pattern recognition module 90. The memory module 92 is configured to store a plurality of machine operating patterns, hereinafter referred to as the plurality of work cycle patterns. Each of the plurality of work cycle patterns includes a plurality of predetermined work segments. In various examples, the plurality of work cycle patterns may be defined based on historical data of various machine operating patterns. The plurality of work cycle patterns may also be defined based on real time field data or lab experimental data. The adaptive adjustment module 88 further includes a gain scheduling module 94 that is in communication with the pattern recognition module 90. The gain scheduling module 94 is configured to store gain maps 95 (shown in FIG. 4) that can be selected by the controller 86 to control the output speed of the variator 36.

The control system 74 further includes a speed sensor 89 disposed on the variator 36. The speed sensor 89 is configured to generate a signal indicative of the output speed of the variator 36 during operation thereof In one example, the speed sensor 89 may be associated with the pump 50 such that the speed sensor 89 may be configured to generate a signal indicative of a speed of the pump 50. The speed of the pump 50 may correspond to the output speed of the variator 36. In another example, the speed sensor 89 may be associated with the motor 58 to generate the signal indicative of the output speed of the variator 36. The controller 86 communicates with the speed sensor 89 to receive the signal indicative of the output speed of the variator 36. The controller 86 is also configured to receive a desired output speed for the variator 36 via an interface 87. The desired output speed may be stored in a memory module (not shown) of the controller 86.

During operation of the machine 10, for example at time $T_O$, the pattern recognition module 90 in communication with the load sensor 80, the front grade sensor 82, and the rear grade sensor 84 receives signals indicative of the multiple operating parameters of the machine 10. The pattern recognition module 90 further determines an operating condition, such as the current work segment of the work cycle patterns, at time $T_O$, based on the operating parameters of the machine 10. In another embodiment, the operating condition of the machine 10 may be determined based on multiple conditions being satisfied, For example, in cases where the machine 10 is an excavator, a condition associated with a pivoting motion of a boom of the excavator, a condition associated with a pivoting motion of a stick, a condition associated with a pivoting motion of a work tool, and/or a condition associated with a pattern of input movements received from an operator via an interface device. The current work segment of the machine 10 is further compared with the plurality of work segments stored in the memory module 92. The pattern recognition module 90 further classifies the current work segment of the machine 10 as one of the plurality of predetermined work segments of the work cycle pattern The current work segment of the machine 10 thus classified is further communicated to the gain scheduling module 94.

Simultaneously, the speed sensor 89 disposed on the variator 36 generates the signal indicative of an actual output speed of the variator 36. The signal is further communicated with the controller 86 that determines the actual output speed of the variator 36. The actual output speed of the variator 36 is further compared with the desired output speed for the variator 36. A variation between the actual output speed of and the desired output speed for the variator 36 is determined as an error value. The controller 86 further communicates a command signal, indicative of the error value, to the gain scheduling module 94. The gain scheduling module 94 further select a closed-loop gain value corresponding to the current work segment of the machine 10 and the error value. In another example, if the current work segment of the machine 10 is not classified under any of the plurality of predefined work segments, then a default closed-loop gain value may be communicated with the controller 86. The closed-loop gain value is further communicated with the controller 86 by the adaptive adjustment module 88. The controller 86 further communicates a command signal indicative of the determined close-loop gain value with the actuator 72. Upon receiving the command signal, the actuator 72 adjust a position of the swash plate 46 to control flow of the hydraulic fluid to the pump 50 and hence to control flow of the hydraulic fluid to the motor 58 to control the output speed of the variator 36.

An example of the gain map 95 stored in the gain scheduling module 94 is illustrated in FIG. 4. The gain map 95 may be predefined based on the various work segments of the work cycle pattern Each of the various work segments of the work cycle pattern may he associated with a closed-loop gain value, hereinafter referred to as 'the gain value'. Further, the gain scheduling module 94 includes a default gain value, which is not associated with any of the various work segments of the work cycle pattern. In the present embodiment, the gain map 95 is shown in a tabular form, however, in other embodiments the gain map 95 may be represented in graphical form or any other form known in the art. As shown in FIG. 4, the error value is plotted along a column in the table and the work segments, such as the dig segment, the reverse lift segment, the forward lift segment, the dump segment, the reverse lower segment, and the forward lower segment are plotted along a row in the table. The gain values corresponding to each of the error values and each of the work segments are defined in the table as shown in the FIG. 4. In one example, referring to the table, during the operation of the machine 10, if the error value is speed error 5 and the operating condition of the machine 10 is the dig segment, then a gain value 2 is communicated with the controller 86 to control the output speed of the variator 36 in response to the desired output speed of the variator 36. In another example, during the operation of the machine 10, if the error value is speed error 5 and the work segment of the machine 10 is not matching with any of the plurality of work segments of the machine 10, then a default gain value, such as the gain value 1 is communicated with the controller 86 to control the output speed of the variator 36. In another example, if a probability of matching of the current work segment of the machine 10 with any one of the plurality of predetermined work segments is below a threshold, then the default gain value corresponding to the error value is communicated with the controller 86. The threshold may be 50% in the illustrated embodiment. However, the threshold may be varied based on a desired performance of the machine 10 and the desired output speed of the variator 36.

The control system 74 further selects a current range corresponding to the current work segment of the machine 10 to actuate the actuator 72. The current range may be predefined for each of the plurality of predetermined work segments of the machine 10 and stored in the adaptive adjustment module 88. Upon classification of the current work segment as one of the plurality of predetermined work segments of the machine 10, a current range corresponding to the classified work segment may be selected and communicated with the controller 86. In an example, the controller 86 may communicate with an electric power source to actuate the actuator 72. The electric power supplied to the actuator 72 from the electric power source may be controlled based on the current range selected for the classified work segment of the machine 10. In an example, during the dig segment, the gain value is determined to give a full protection for the engine 16 or the transmission system 14 because the unexpected impact load may be very high. During the dig segment, the actuator 72 of the swash plate 46 may experience a huge torque reversal as well, and hence the pull-in current and hold-in current of the actuator 72 are maximized to ensure response of the actuator 72 which directly affect response of the swash plate 46. The position of the swash plate 46 determines the flow rate of the hydraulic fluid from the pump 50 and hence the output torque of the motor 58.

INDUSTRIAL APPLICABILITY

The present disclosure relates to a method 96 for controlling the variator 36 of the transmission system 14 of the machine 10 during the operation of the machine 10. At step 98, the method 96 includes storing the plurality of work cycle patterns in the memory module 92 of the control system 74. Further, each work cycle pattern includes the plurality of predetermined work segments and each predetermined work segment is associated with the closed-loop gain value. In an example, the method 96 may be implemented by the control system 74. The control system 74 stores the plurality of the work cycle patterns, each having the plurality of work segments. At step 100, the method 96 includes determining, by the control system 74, the various operating parameters of the machine 10 based on the inputs from the machine sensors 76. At step 102, the method 96 includes detecting the current work segment of the machine 10 based on the determined operating parameters of the machine 10. At step 104, the method 96 includes classifying the detected current work segment of the machine 10 as one of the number of predetermined work segments based on the plurality of work cycle patterns and the current work segment. At step 106, the method 96 includes determining the error value based on the actual output speed of the variator 36 and the desired output speed of the variator 36. At step 108, the method 96 includes determining the closed-loop gain value corresponding to the current work segment and the error value. For example, different gains will be utilized during a different work segment. For example, the dig segment may use different proportional and integral gains compared to that in the dump segment. As such aggressive gain values may be used during the dig segment to ensure response and different gain values may be used in the dump segments to ensure stability to avoid overshooting or oscillation of the motor 58. Thus the gain map 95 helps to improve performance of the control system 74 by increasing stability of the control system 74 and a response time to control the output speed of the variator 36 in response to the desired output speed of the variator 36. The response time may indicate how quickly an actual speed of the pump 50 may respond to meet a desired speed of the pump 50.

At step 110, the method 96 includes determining the current range for actuating the actuator 72 of the variator 36 based on the current work segment. At step 112, the method 96 includes implementing the determined closed-loop gain value and the determined current range to the actuator 72 to adjust the position of the swash plate 46 of the variator 36, to control the output speed of the variator 36. In an example, the controller 86 implements different gain values for different work segments and supplying the selected current range to the actuator 72. The control system 74 can also select different current ranges and communicate with the controller 86 to control the actuator 72. During the dig segment, the swash plate 46 may need more tierce to change the position due to a high hydraulic flow rate generated by the pump 50. In order to ensure the full activation, high pull-in and hold-in current are needed. During the dump segment, the control system 74 can use lower currents to activate the actuator 72. The adjustment can improve the components useful life without affecting the performance of the variator 36.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for controlling a variator of a transmission system of a machine, the method comprising:

storing a plurality of work cycle patterns associated with an operation of the machine in a memory module of a control system, each of the plurality of work cycle patterns including a plurality of predetermined work segments, wherein each of the plurality of predetermined work segments is associated with a closed-loop gain value;

determining by the control system, operating parameters of the machine based on inputs from a plurality of machine sensors;

detecting a current work segment of the machine based on the determined operating parameters of the machine;

classifying the detected current work segment of the machine as one of the plurality of predetermined work segments based on the plurality of work cycle patterns and the current work segment;

determining an error value based on an actual output speed of the variator and a desired output speed of the variator;

determining a closed-loop gain value corresponding to the current work segment and the error value;

determining a current range for actuating an actuator of the variator based on the current work segment; and implementing the determined closed-loop gain value and the determined current range to the actuator to adjust position of a swash plate of the variator to control an output speed of the variator.

* * * * *